United States Patent Office 3,367,106
Patented Feb. 6, 1968

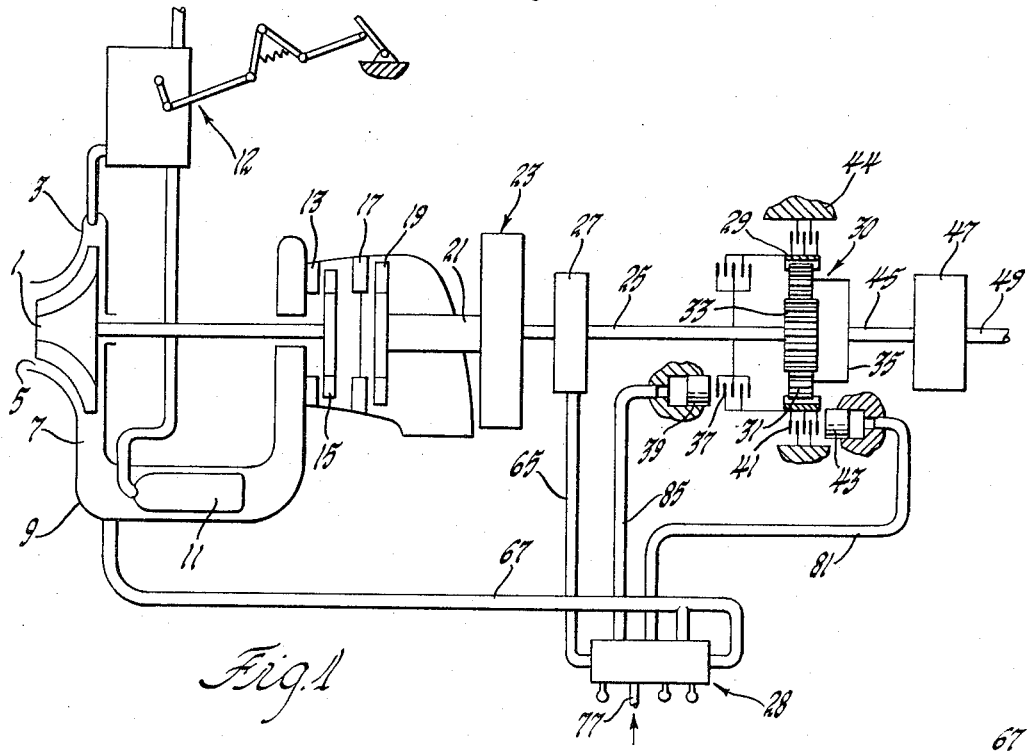

3,367,106
GAS TURBINE POWER TRAIN AND CONTROLS
Donovan L. Robinson, Plainfield, Ind., assignor to General Motors Corporation, Detroit, Mich., a corporation of Delaware
Filed Apr. 25, 1966, Ser. No. 544,942
14 Claims. (Cl. 60—39.2)

ABSTRACT OF THE DISCLOSURE

A gas turbine power train having a transmission input two speed splitter unit provided by a planetary gear set conditioned for splitter low ratio by a brake and for splitter high ratio by a clutch. The splitter ratios are automatically selected by a shifter valve biased toward a downshift position by gas turbine compressor discharge pressure and toward an upshift position by Pitot governor pressure driven by the power turbine. The valve is designed with a differential area so that compressor discharge pressure provides a variable hysteresis force appropriate to engine speed so that upshift and downshift points are close to optimum engine operating power levels for all throttle settings.

---

This invention relates to automatic transmissions and controls utilizing engine operating signals for automatic shifting under optimum engine operating conditions. More particularly this invention pertains to controls for gas turbine engine powered transmissions in which control upshift bias is provided by compressor discharge pressure and downshift bias is provided by a pressure signal responding directly to engine output speed.

According to this invention there is provided a straightforward shift control valve which responds to engine operating signals to control, apply and release of ratio establishing devices in a multi-ratio transmission. Among the important benefits obtained by the use of such a control are the elimination of complex valving such as the throttle and throttle regulating valve and elimination of the transmission splitter output governor. Furthermore the direct utilization of engine function signals without resorting to such intermediate valving improves control reliability, response, and provides for a more efficient power train. In this invention, the use of compressor discharge pressure to provide a variable hysteresis force appropriate to engine speed results in a favorable relationship between upshift and downshift points for all engine output speeds. Thus, the upshift and downshift points are close to the optimum power levels for all engine throttle settings.

An object of this invention is to provide automatic transmission controls operable in direct response to variations in engine operating conditions.

Another object of this invention is to provide a gas turbine engine, an automatic change speed transmission, a transmission control pressure provided by compressor discharge pressure of the gas turbine engine and a second transmission control pressure which reflects engine output speed.

Another object of this invention is to provide in combination: a gas turbine engine; a multi-ratio transmission; a signal force reflecting engine torque demand by gas turbine engine compressor discharge pressure for downshifting the transmission; and a signal force reflecting power turbine speed for upshifting the transmission.

These and other objects of the invention will be more apparent from the following description of the preferred embodiment of the invention illustrated in the accompanying drawings in which:

FIGURE 1 is a diagrammatic view illustrating a gas turbine power plant, a multi-ratio automatic transmission and controls;

FIGURE 2 is a sectional view of a shift valve according to this invention; and

FIGURE 3 is a plot of turbine engine performance curves.

As shown in FIGURE 1, there is a gas turbine engine having an air compressor 1 located in a housing 3 having an inlet 5 and an outlet 7. The compressor delivers air under pressure through the compressor outlet through duct 9 in which fuel burner 11 is located. Suitable controls 12, such as those disclosed in U.S. Patent 3,093,010, are employed to regulate fuel supply to burner 11. The duct 9 delivers high temperature gas through the nozzles 13 to drive the compressor turbine 15 which drives compressor 1. The gas passes through nozzles 17 to drive the power turbine 19 and connected power shaft 21. Power shaft 21 drives a reduction gear ratio provided in unit 23 for reducing the high turbine speeds to a lower, readily usable speed. The unit 23 has an output shaft 25, whose speed is limited by fuel controls, not shown, responding to signals from a Pitot governor 27 driven by this shaft. The governor 27 also furnishes a signal to a shift control valve 28 dependent on the output speed of the power turbine. The shaft 25 drives the can of the governor 27, which rotates oil from the lubrication system. A Pitot tube, not shown, located in the annulus of oil senses any change in pressure which denotes a change in power turbine speed. As shown shaft 25 extends through governor 27 and also drives the ring gear 29 of a splitter planetary gear unit 30. Ring gear 29 of this unit meshes with planets 31 that in turn mesh with the sun gear 33. The planets 31 are rotatably mounted on a carrier 35 which provides the splitter unit output.

Suitable friction devices are provided to effect ratio change in the splitter; and, as shown, a friction clutch unit 37 controlled by motor 39 couples the carrier and the sun gear for a lock-up to provide a splitter high range. Brake unit 41—controlled by motor 43— is capable of grounding the sun gear 33 to the transmission case 44 for splitter low drive. The output carrier 35 drives shaft 45 which provides an input into the change speed gear unit 47. This gear unit has an output shaft 49 which provides the transmission output.

The shift control valve 28, shown diagrammatically in FIGURE 1 and in greater detail in FIGURE 2, includes a valve element 53 which is movably mounted within the valve housing 55. As shown in FIGURE 2, the valve element has spaced lands 57, 59 and 61, with land 61 forming one end of the element. A movable plug 63 is movably mounted within the valve housing and contacts the other end of the valve element. A pressure line 65, leading from the tube of the Pitot governor to the end of valve housing and one end of the movable plug 63, allows the plug to sense any change in Pitot governor pressure. A second pressure line 67 extends from the gas turbine outlet 7 to both port 71 and port 72, formed in the valve body to supply compressor discharge biasing pressure to the valve element. As shown, port 71—when not blocked by land 59—connects line 67 to the chamber between the lands 59 and 61, while port 72 connects the chamber 69 to the compressor discharge. It will be seen that land 59 has an appreciably larger effective area than land 61 to provide an upshift hysteresis. An exhaust 73 is provided in the valve body to exhaust the chamber betweens lands 59 and 61 on an upshift.

A port 75 in the valve body provides an entrance for main line pressure supplied by main line 77 between lands 57 and 59 in the downshifted position, and between land 57 and plug 63 in the upshifted position. In the downshifted position, land 59 clears port 79, which is connected to the low range motor 43 by line 81; the exhaust 83 for the low range motor is at this time closed by land 59. The valve element is movable in the valve body; and under predetermined pressure conditions—reflected by the Pitot governor and the compressor discharge pressure-shifts to the right in viewing FIGURE 2 for splitter high operation. In this shifted position, land 57 will block main line pressure from entering the splitter low line and will connect main line pressure to the splitter high line 85, which is connected into the valve body at port 87. The plug 63 is moved by the biasing force of the Pitot governor pressure to the right so that exhaust 89, for the splitter high motor 39, is closed and that motor is actuated by main line pressure. At this time, the land 59 will be moved to the right a sufficient distance to open exhaust 83 so that the splitter low motor will be exhausted. Land 59 will also block port 71 leading to the chamber 60 between the lands 59 and 61 so that the compressor discharge pressure is effective only in chamber 69. Chamber 60 will be exhausted by exhaust 73 at this time. Since line 85 is pressurized, the motor 38 will be actuated to engage the clutch unit 37 so that the sun gear 33 and carrier 35 will connect and the planetary splitter unit will rotate as a unit, for splitter high operation. A reduction ratio may, of course, be provided by the change speed gear unit 47.

If there is increased load, such as when the vehicle utilizing this transmission ascends an incline, the power turbine will slow down and the vehicle operator depresses the throttle pedal which controls the supply of fuel for burner 11. Compressor discharge pressure will rise and the increased bias provided by this pressure will move the valve element to the FIGURE 2 position. As soon as port 71 is cleared by the moving valve element, increased bias is provided by compressor discharge pressure on the area differential provided by land 59. Splitter high line is opened to exhaust 89 and splitter low line 81 is connected to main pressure line 77 to effect splitter low operation. Upon movement of the valve element to the left to the FIGURE 2 position, the larger downshift bias provided by compressor discharge pressure on lands 59 and 61 is established for hysteresis on subsequent upshifting.

Assuming the vehicle transmission is in splitter low and the load decreases, such as might occur on a slight downgrade, the operator will partly release the throttle pedal decreasing compressor discharge pressure. When the bias of the power turbine governor pressure is greater than the effective bias of the compressor discharge pressure, the valve element will move to the right to upshift the transmission by opening main line to splitter high and will exhaust the splitter low line in the manner described. Downshift hysteresis is provided since land 59 blocks port 71 and compressor discharge pressure will not reach land 59 during splitter high operation. However, port 72 is still open and the compressor discharge pressure is connected to the end area of land 61 for reduced bias on valve element 53 at this time.

FIGURE 3 shows a family of power curves for the gas turbine engine with each curve representing a different throttle setting. The lower power curve is for light throttle and the higher curves are for respectively increasing throttle settings. Thus, curve c is the engine power curve for a predetermined throttle setting in which compressor or gasifier speed will be 30,000 r.p.m. and with optimum power occurring at an engine output speed as reduced by unit 27 of approximately 2,900 r.p.m. The downshift speed curve e intersects curve c at engine output speed of about 2,400 r.p.m. and the upshift curve f intersects curve c at an engine output speed of approximately 3,300 r.p.m. These upshift and downshift points are high on the power curve c and show that shifting is accomplished under optimum engine operating conditions. As shown by FIGURE 3 the upshift and downshift points are high on each power curve throughout the complete operating range of the gas turbine engine. Thus, the use of compressor discharge pressure provides a hysteresis force appropriate to the speed sensing force provided by governor pressure on the end area of plug 63. As is illustrated by the curves of FIGURE 3, this provides a favorable relationship between the upshift and downshift points regardless of engine output speed.

It will be appreciated that the splitter unit provides two speed input into the range unit to double the number of ratios provided by the range unit. Thus, if the range unit is in its low range ratio, splitter low will further increase this ratio for overall transmission low range drive. Second overall transmission ratio will occur automatically as the splitter unit upshifts to splitter high operation. Thus overall transmission second range is equal to the largest reduction ratio of the range unit. Shift between low and second is automatic as determined by engine operating conditions. Similarly, other overall transmission ratios may be provided.

It will be appreciated that this invention provides highly effective power shifting as the upshift and downshift signals directly signify the operating condition of the engine itself.

In the preferred embodiment the pressure areas of plug 63 and land 61 are equal so that compressor discharge pressure must be greater than the Pitot governor pressure to force the valve element from the upshift to the downshift position. Since the hysteresis effect in this invention is operated directly by the variable compressor discharge pressure, there is no requirement for main pressure modulation for hysteresis as in prior controls for gas turbine engines. Furthermore, the hysteresis effect of this invention provides the added benefit of having the shift points high on each power curve to approach maximum engine efficiency.

Although controls incorporating a single valve for controlling a pair of ratios have been shown and described, additional valves similar to valve 28 may be used to control other pairs of ratios. Thus, if a four speed unit is utilized, a first valve would control shifts between first and second ranges, a second valve would control shifts between second and third ranges, while a third valve controls shifts between third and fourth ranges. The control circuit is arranged so that the power turbine governor pressure will act upon the first valve in all speed ranges, the second valve in the second, third and fourth speed ranges and the third valve in the third and fourth speed ranges. The control circuit is further arranged so that compressor discharge pressure will act upon the first valve in the first and second ranges, the second valve in the first, second and third ranges and the third valve in all of the speed ranges. This control would provide the system with sequenced shifts responsive to engine operating conditions in a manner similar to that described in connection with control valve 28.

It will be understood that changes may be made to this preferred disclosed and described embodiment without departing from the spirit of the invention. It is therefore to be appreciated that this invention is not to be restricted by the particular operative embodiment disclosed, but only by the limitations set forth in the claims which follow.

I claim:

1. In combination, a gas turbine engine having an output and producing a variable compressor discharge pressure, a change ratio drive unit having an input driven by said engine output and having an output member, said unit including at least two different ratios, shift control means for changing the ratios in said unit, said shift control means including movable valve means operative in one position to effect upshifting of said drive unit and movable to another position to effect downshifting said unit, fluid conducting means directly coupling said compressor discharge pressure to said movable valve means to permit said compressor discharge pressure to provide a downshift bias thereon and speed responsive means driven by said engine and operatively coupled to said movable valve means for providing an upshift bias on said movable valve means.

2. The combination of claim 1 in which said speed responsive means is a governor driven directly by said engine output to provide an engine speed responsive pressure effective on said movable means to provide said upshift bias.

3. The combination of claim 2 in which said compressor discharge pressure provides hysteresis force appropriate to the speed responsive pressure so that downshift and upshift points are close to the maximum power output of said engine for any engine output speed.

4. In combination, an engine, a transmission for said engine including a multi-ratio drive unit having an input driven by said engine, shift control valve means operatively connected to said unit to control the ratios thereof, a governor driven by said engine, said governor providing, first signal means proportional to engine output speed for exerting an upshift bias on said valve means, second signal means responding directly to engine torque demand operatively coupled to said shift control valve means to provide downshift bias thereon, said shift control valve means responding to variations in upshift and downshift bias to accordingly selectively control said multi-ratio unit.

5. The transmission of claim 4, in which said engine includes a compressor and a compressor discharge passage, said second signal means being provided by compressor discharge pressure, said shift control means includes a movable shifter valve element, said valve element being movable in one direction in response to increasing compressor discharge pressure to downshift said multi-ratio unit and movable in an opposite direction in response to increased bias from said first mentioned signal means to upshift said multi-ratio unit.

6. The transmission of claim 5 in which said first mentioned signal means is provided by a governor driven by said engine output.

7. The transmission of claim 6 in which said shifter valve includes a plurality of lands which respond to variable compressor discharge pressure to provide for upshift and downshift hysteresis.

8. The transmission of claim 4 in which said transmission includes a range gear unit having a plurality of ratios, said multi-ratio drive unit providing an input for said range unit, said multi-ratio unit operative to change overall transmission ratios by automatic operation of said shift control means.

9. In a transmission for a gas turbine driven change ratio transmission, shift control means for changing ratios of said transmission, said shift control means including valve means directly connected to said gas turbine and directly biased in one direction by gas turbine compressor discharge pressure to tend to move said valve toward a downshift position and biased in an opposite direction by a variable pressure solely dependent on engine output speed for upshift bias.

10. The invention defined in claim 9 in which said compressor discharge pressure provides a variable hysteresis force on said valve means appropriate to opposing speed responsive forces to thereby provide a favorable relationship between upshift and downshift points for all engine output speed so that downshifts timely occur resulting in maximum engine performance at all speeds.

11. In combination, a gas turbine engine having a compressor, an output and producing a variable compressor pressure, a multi-ratio drive unit operatively connected to be driven by said engine and having an output, said unit being operable to selectively provide at least two different drive ratios, speed signal means operatively connected to one of said outputs providing a speed signal proportional to the speed thereof, shift control means operatively connected to said drive unit and directly to said gas turbine engine and said signal means, said shift control means including means operable in one position to establish one ratio drive and in another position to establish another ratio drive, and said shift control means including means directly responding to compressor discharge pressure to increasingly bias said drive establishing means to one of said positions with increasing compressor discharge pressure and further including means responsive to said speed signal to increasingly bias said shift control means to the other of said positions with increasing speed.

12. In combination, a gas turbine engine having an output and producing a variable compressor discharge pressure, a change ratio drive unit having an input driven by said engine output, said unit including at least two different ratios, shift control means for changing the ratios in said unit, said shift control means including a shifter valve element having a plurality of lands, said valve element being operative in one position to effect upshift of said drive unit and movable to another position to effect downshift of said unit, means operatively coupling said compressor discharge pressure to said movable valve unit to permit compressor discharge pressure to provide a downshift bias thereon, speed responsive means operatively coupled to said valve element providing upshift bias thereon, said speed responsive means being directly driven by said engine output to provide an engine speed responsive pressure effective on said valve element to provide the upshift bias, said compressor discharge pressure being effective on a predetermined area provided by said lands when said element is in a downshift position to increase downshift bias for hysteresis on subsequent upshifting, and on a predetermined smaller area provided by one of said lands when said element is in an upshift position to reduce downshift bias for hysteresis on subsequent downshift.

13. The combination of claim 12 in which compressor discharge pressure is effective only at one end of said element when said element is in an upshifted position and said engine speed responsive pressure is effective at the other end of said valve element, said valve element being movable when said compressor discharge pressure is greater than said engine speed responsive pressure.

14. In combination, a gas turbine engine having an output and producing a variable compressor discharge pressure, a change ratio drive unit having an input driven by said engine output, said unit including at least two different ratios, shift control means for changing the ratios in said unit, said shift control means including a shifter valve element having a plurality of lands, said valve element being operative in one position to effect upshift of said driven unit and movable to another position to effect downshift of said unit, means operatively coupling said compressor discharge pressure to said valve element to permit compressor discharge pressure to provide a downshift bias thereon, speed responsive means operatively coupled to said valve element providing upshift bias thereon, said speed responsive means being directly driven by said engine output to provide an engine speed responsive pressure effective on said valve element to provide the upshift bias, said compressor discharge pressure being effective on two of said lands when said element is in a downshift position to increase downshift bias for hysteresis on subsequent upshifting, said compressor discharge pressure being blocked for one of said last mentioned lands when said element is in an upshift position to reduce downshift bias for hysteresis on downshift subsequent to predetermined rise in compressor discharge pressure.

References Cited

UNITED STATES PATENTS 2,845,819  8/1958  Laburte _____ 74—472 X
3,093,010  6/1963  Spreitzer et al. _____ 74—472 X JULIUS E. WEST, *Primary Examiner.*